N. T. HARRINGTON.
CHECK VALVE.
APPLICATION FILED JAN. 27, 1908.
917,294.  Patented Apr. 6, 1909.
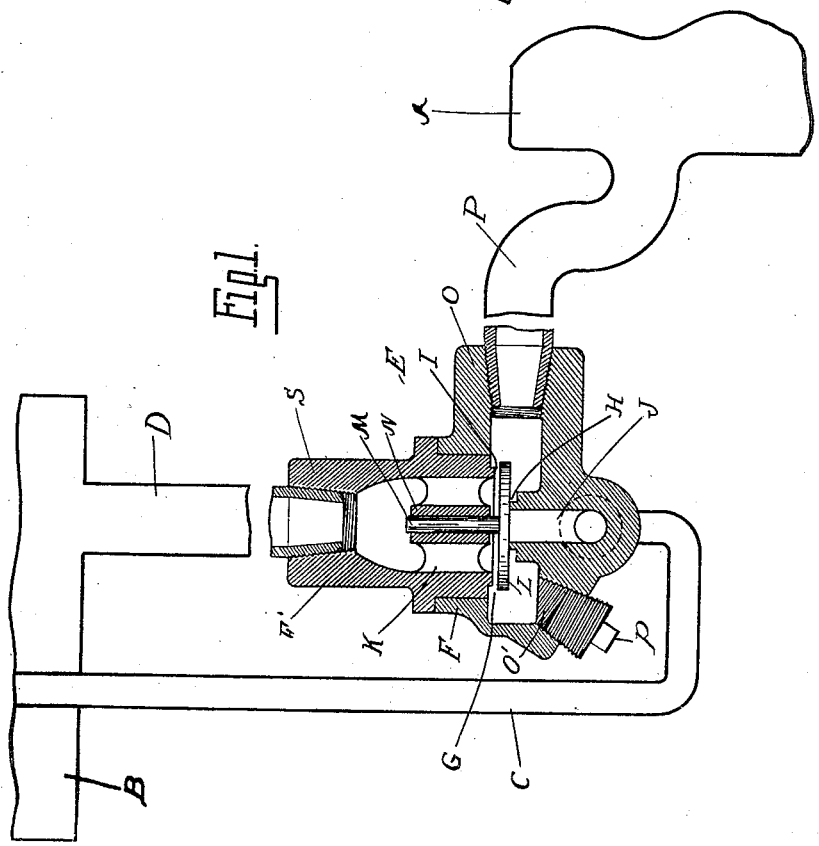
Witnesses
Inventor
Norman T. Harrington.
By
Attys

UNITED STATES PATENT OFFICE.

NORMAN T. HARRINGTON, OF LANSING, MICHIGAN.

CHECK-VALVE.

No. 917,294.   Specification of Letters Patent.   Patented April 6, 1909.

Application filed January 27, 1908. Serial No. 412,832.

*To all whom it may concern:*

Be it known that I, NORMAN T. HARRINGTON, a citizen of the United States of America, residing at Lansing, in the county of Ingham and State of Michigan, have invented certain new and useful Improvements in Check-Valves, of which the following is a specification, reference being had therein to the accompanying drawings.

It is the object of the invention to obtain a construction of valve which is adapted for controlling two separate conduits, and for alternately establishing communication therebetween and a common passage or chamber.

To this end the invention consists in the construction as hereinafter set forth.

In the drawings—Figure 1 is a vertical central section; and Fig. 2 is a sectional elevation looking at right angles to Fig. 1.

My invention is particularly applicable for use in controlling the outgoing and return connections from one tank to another, and where the liquid is propelled by pulsating changes in pressure in the two tanks.

As illustrated, A is the supply tank, or receptacle, and B is a second tank, or receptacle, into which the liquid is drawn from the tank A by periodic suction impulses.

C is the supply conduit leading to the tank B, and D is a return conduit from the tank B to the tank A.

E is my improved construction of check valve for controlling each of the conduits C and D, and which is of the following construction: F is a casing containing a chamber G in which are formed two oppositely facing annular valve seats H and I of different diameters. The lower seat H surrounds a port J which connects with the conduit C, while the upper seat I surrounds a port or passage K of considerably larger area than the port J and communicates with the conduit D. L is a disk valve which normally rests upon the seat H, and which is of sufficient diameter to also register with the larger annular seat I, from which it is normally separated. This valve is suitably guided within the casing F, as by a stem M engaging a guide bearing N in a spider within the casing F. O is a nipple on the casing F for connecting with a conduit P, forming a connection between the tank A and the chamber G. The chamber G may be cleaned through the port O', or the oil which accumulates therein may be drained off, and P' is a plug closing said port.

With the construction as described, the valve L, together with the stem M, is of sufficient weight to balance the hydrostatic pressure of the liquid in the port J due to its connection with the conduit C leading to the tank B. Thus the valve will normally rest upon the seat H and cut off communication between the tank A and the conduit C. Upon each suction impulse within the tank B, the pressure exerted through the conduit D upon the upper face of the valve L is reduced, and consequently the pressure upon the annular portion of the lower face of said valve, which surrounds the valve seat H, will be sufficient to lift the valve from said seat and press it in contact with the upper seat I. This will cut off communication between the conduit D and the tank A and establish communication between said tank and the conduit C, while the reduction in pressure in the tank B will permit the pressure in the tank A to raise the liquid through the conduit C. When the suction impulse ceases, a normal pressure is restored in the tank B, and the valve L will drop by gravity away from its seat I and against the seat H, thereby cutting off the conduit C and connecting the conduit D to the tank A. Thus the single valve controls both connections.

In constructing the valve, I preferably form the casing of two members, F and F', the latter forming a cap member, and containing the seat I and guide bearing N, while the casing F has the seat H formed therein. The casing F is further provided with the nipples O and R, which respectively connect with the conduits P and C, while the casing F has the nipple S for connecting with the conduit D.

What I claim as my invention is:

1. A check valve comprising a casing having formed therein two oppositely facing annular valve seats, surrounding ports of different areas and a disk valve normally resting on the lower seat and closing the smaller port, said valve also extending in proximity to the upper seat and having an annular portion extending beyond the smaller seat and into registration with the upper seat for the larger port, for the purpose described.

2. A check valve comprising a casing having formed therein two oppositely facing annular valve seats respectively surrounding ports of different areas, a disk valve normally held by gravity against the lower seat and closing the smaller port, said valve being of a diameter to extend into registration with the seat surrounding the larger port, and means for guiding said valve permitting of the vertical movement thereof between its seats.

3. A check valve comprising a casing having formed therein two passages communicating with a common passage or chamber by ports of different area, a valve for alternatively closing said ports and adapted to normally close the port of the smaller area against the hydrostatic pressure of a fluid therein.

4. A check valve comprising a casing having formed therein two passages communicating with a common passage or chamber through opposed ports of different area, a disk valve for alternatively closing said ports and movable therebetween, said valve being adapted to normally close the smaller port against the hydrostatic pressure of a fluid therein.

5. A check valve comprising a casing having formed therein two axially alined opposed ports communicating with a common chamber, annular valve seats surrounding the respective ports, a disk valve for alternative engagement with said seats and having an area surrounding the smaller seat exposed to the pressure within said chamber, said valves being normally held in contact with said smaller seat.

6. A check valve comprising a casing formed in two parts, an annular valve seat surrounding a port in one of said parts, an annular valve seat surrounding a port of larger area in the other of said parts, said ports and seats being concentrically arranged and opposed to each other, and a disk valve for alternative engagement with said seats movable therebetween.

In testimony whereof I affix my signature in presence of two witnesses.

NORMAN T. HARRINGTON.

Witnesses:
W. W. MONTGOMERY,
C. J. KRYZCMOWSKY.